(12) United States Patent
Okada et al.

(10) Patent No.: US 9,673,678 B2
(45) Date of Patent: Jun. 6, 2017

(54) MOTOR

(71) Applicant: NIDEC TECHNO MOTOR CORPORATION, Minami-ku, Kyoto (JP)

(72) Inventors: Takeshi Okada, Kyoto (JP); Yasunobu Yuki, Kyoto (JP); Lu Qiang, Kyoto (JP); Hirotada Tanaka, Kyoto (JP); Yusuke Inaki, Kyoto (JP)

(73) Assignee: NIDEC TECHNO MOTOR CORPORATION, Kyoto (JP)

( * ) Notice: Subject to any disclaimer, the term of this patent is extended or adjusted under 35 U.S.C. 154(b) by 228 days.

(21) Appl. No.: 14/577,221

(22) Filed: Dec. 19, 2014

(65) Prior Publication Data

US 2015/0188383 A1 Jul. 2, 2015

(30) Foreign Application Priority Data

Dec. 26, 2013 (JP) .................................. 2013-268423

(51) Int. Cl.
| | |
|---|---|
| *H02K 5/24* | (2006.01) |
| *H02K 5/02* | (2006.01) |
| *H02K 5/16* | (2006.01) |
| *H02K 5/08* | (2006.01) |
| *H02K 5/173* | (2006.01) |
| *H02K 5/167* | (2006.01) |

(52) U.S. Cl.
CPC ................ *H02K 5/24* (2013.01); *H02K 5/02* (2013.01); *H02K 5/08* (2013.01); *H02K 5/161* (2013.01); *H02K 5/1732* (2013.01); *H02K 5/1672* (2013.01)

(58) Field of Classification Search
CPC H02K 5/02; H02K 5/24; H02K 5/161; H02K 5/08; H02K 5/1672
See application file for complete search history.

(56) References Cited

U.S. PATENT DOCUMENTS

| | | | | | |
|---|---|---|---|---|---|
| 2,042,666 | A | * | 6/1936 | Kunkle | ..................... H02K 5/24 248/605 |
| 3,235,653 | A | * | 2/1966 | Ostrognai | ............... F16F 1/376 248/606 |
| 6,462,446 | B2 | * | 10/2002 | Cook | ....................... H02K 5/24 248/638 |

(Continued)

FOREIGN PATENT DOCUMENTS

JP         09-285068 A      10/1997

*Primary Examiner* — Dang Le
(74) *Attorney, Agent, or Firm* — Cantor Colburn LLP

(57) ABSTRACT

An inner rotor motor may include a shaft, a rotor, a stator, an upper bearing, a lower bearing, a motor casing that includes an opening at an upper portion, a casing cover that holds the upper bearing and covers the opening of the motor casing, and a lower damping member. The motor casing may include a cylindrical portion, a bottom wall portion that extends inward from the cylindrical portion, and a lower boss portion that is formed in the shape of a bottomed cylinder protruding downward from a bottom of the bottom wall portion. The lower bearing is disposed inside the lower boss portion, and the lower damping member is disposed outside the lower boss portion ion. The lower boss portion is provided with a lower boss recess, and the lower damping member is provided with a concave or convex rotation prevention portion.

18 Claims, 13 Drawing Sheets

(56) References Cited

U.S. PATENT DOCUMENTS

| | | | | |
|---|---|---|---|---|
| 2006/0220474 A1* | 10/2006 | Yoshida | ............... | H02K 11/40 310/43 |
| 2008/0042499 A1* | 2/2008 | Okada | ............... | H02K 5/08 310/43 |
| 2012/0326538 A1* | 12/2012 | Yoshida | ............... | H02K 5/08 310/43 |

* cited by examiner

MOTOR

CROSS REFERENCE TO RELATED APPLICATION

The present invention claims priority under 35 U.S.C. §119 to Japanese Application No. 2013-268423 filed Dec. 26, 2013, the entire contents of which are incorporated herein by reference.

BACKGROUND

1. Field of the Invention

The present invention relates to a motor, and more particularly, to the improvement of a motor that includes a motor casing made of a resin.

2. Description of the Related Art

An outdoor unit of an air conditioner includes a fan motor that drives a blower fan. A DC brushless motor having high efficiency has been employed as the fan motor due to a demand for energy saving in recent years. However, since vibration, which is caused by cogging torque, is generated in the DC brushless motor, there is a problem in that noise is generated from the outdoor unit.

A molded motor is known as a motor in which such vibration and noise can be suppressed. A stator of the molded motor is embedded in a motor casing by insert molding. For this reason, the molded motor is excellent in a damping property and a sound insulation property, and has a superior waterproof property. Accordingly, the molded motor is a versatile motor that can be used for not only an air conditioner but also various uses.

Further, a structure in which a damping member is disposed in a motor casing is known as a technique for improving the damping property and the sound insulation property of a fan motor (for example, Patent Document 1: JP-A-09-285068). In a fan motor 10 disclosed in Patent Document 1, an annular damping member 11 is provided on the outer periphery of a bearing portion 10*a*. The bearing portion 10*a* is supported by a holding portion 12*a* of a fan casing 12 with a damping member 11 interposed therebetween. For this reason, the vibration of the fan motor is absorbed by the damping member 11. Further, the generation of noise, which is caused by the transmission of the vibration to the fan casing 12, is prevented.

However, the damping member disclosed in Patent Document 1 rotates relative to a motor body due to vibration during the operation of the fan motor. As a result, the inner peripheral surface of the damping member wears out and the damping performance of the damping member deteriorates. Alternatively, there is a problem in that the position of the fan motor relative to the fan casing shifts.

SUMMARY

The invention has been made in consideration of the above-mentioned circumstances, and at least an embodiment of the invention provides a motor that can prevent the rotation of a damping member relative to a motor body.

According to at least an embodiment of the invention, there is provided a motor that includes a shaft, a rotor, a stator, an upper bearing, a lower bearing, a motor casing made of a resin, a casing cover, and a lower damping member. The shaft is disposed so that a central axis of the shaft is parallel to a vertical direction. The rotor is fixed to the shaft. The stator is disposed outside the rotor in a radial direction. The upper bearing is disposed above the rotor and supports the shaft so as to allow the shaft to be rotatable. The lower bearing is disposed below the rotor and supports the shaft so as to allow the shaft to be rotatable. The motor casing includes an opening formed at an upper portion thereof in an axial direction. The casing cover holds the upper bearing and covers the opening. The lower damping member is formed of an annular elastic material. The motor casing includes a cylindrical portion, a bottom wall portion, and a lower boss portion. The cylindrical portion covers an outer periphery of the stator. The bottom wall portion extends inward from the cylindrical portion in the radial direction. The lower boss portion is formed in the shape of a bottomed cylinder that protrudes downward from a bottom of the bottom wall portion in the axial direction, the lower bearing is disposed inside the lower boss portion in the radial direction, the lower damping member is disposed outside the lower boss portion in the radial direction, and a lower boss recess or a lower boss protrusion is provided on an outer peripheral surface of the lower boss portion. A convex or concave rotation prevention portion is provided on an inner peripheral surface of the lower damping member. The convex rotation prevention portion is received in the lower boss recess or the concave rotation prevention portion receives the lower boss protrusion.

In the motor according to the aspect of the invention, the lower boss recess or the lower boss protrusion is provided on the outer peripheral surface of the lower boss portion of the motor casing. Further, the convex rotation prevention portion, which is received in the lower boss recess, or the concave rotation prevention portion, which receives the lower boss protrusion, is provided on the inner peripheral surface of the lower damping member that is disposed outside the lower boss portion in the radial direction. Accordingly, it is possible to prevent the lower damping member from rotating relative to the motor casing.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

Embodiments of the invention will be described below with reference to the drawings. In this specification, a direction of a central axis J of a motor will be described as a vertical direction for convenience sake. However, the posture of the motor at the time of use of the motor according to the invention is not limited. Further, in this specification, the direction of the central axis J of the motor will be simply referred to as an "axial direction" and a radial direction and a circumferential direction about the central axis J will be simply referred to as a "radial direction" and a "circumferential direction".

First Embodiment

Figure 1:
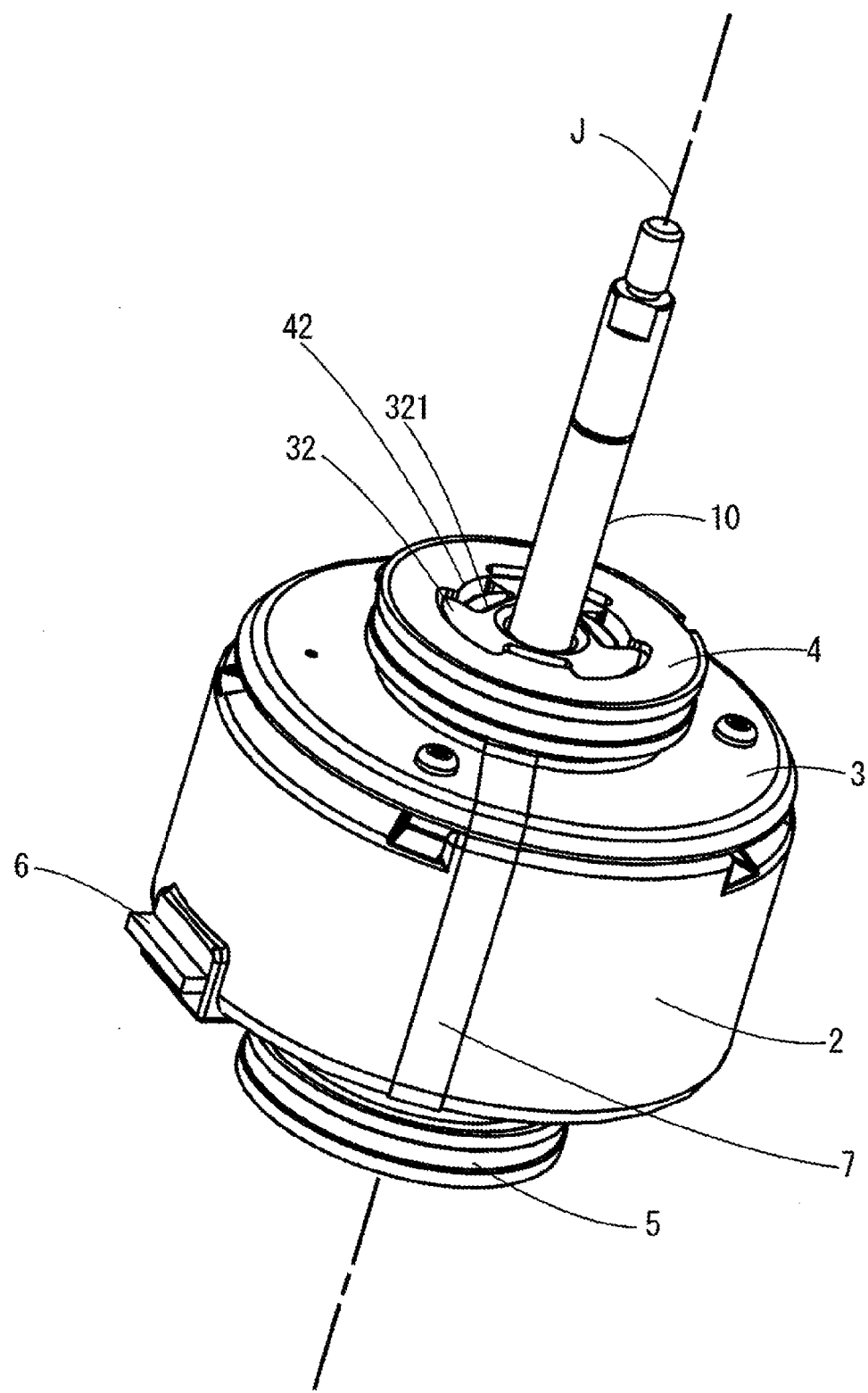
FIG. 1 is a perspective view of the appearance of a molded motor 100 according to a first embodiment.
Figure 2:
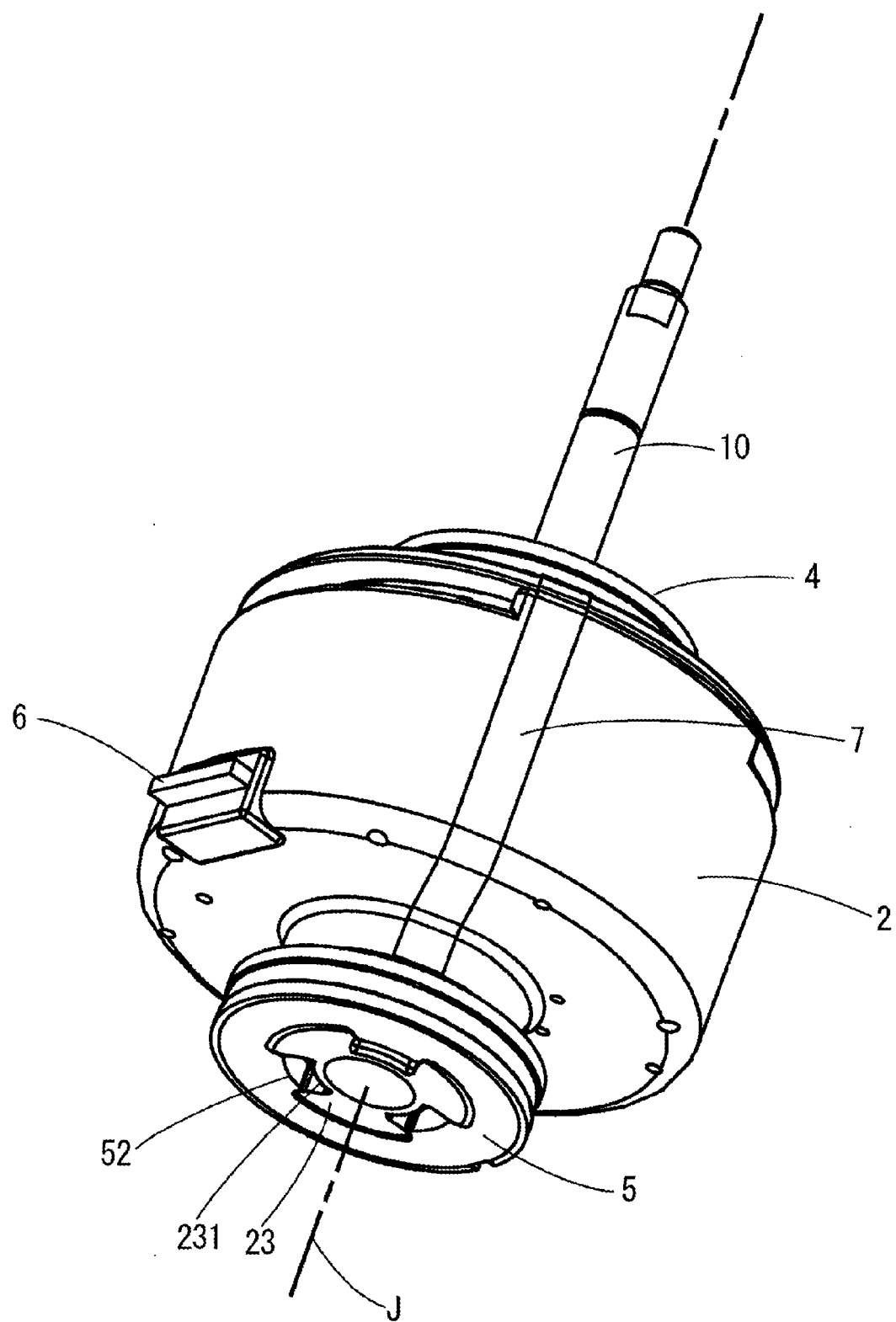
FIG. 2 is a perspective view of the appearance of the molded motor 100.

FIGS. 1 and 2 are perspective views of the appearance of an example of the structure of a molded motor 100 according to a first embodiment of the invention, and show the appearance of the molded motor when the molded motor is seen in different directions.

The molded motor 100 is an inner rotor motor that includes a housing made of a resin, and is used as a driving source of a driving unit of home appliances, business machines, medical equipment, automobiles, and the like. A shaft 10, which protrudes from the housing, is a rotating shaft that is disposed along the central axis J extending in the vertical direction. The housing includes a bottomed cylindrical motor casing 2 that includes an opening formed at an upper portion thereof in the axial direction and a casing cover 3 that covers the opening of the motor casing 2.

An upper boss portion 32, which protrudes upward in the axial direction, is formed on the casing cover 3. An upper damping member 4 is mounted outside the upper boss portion 32 in the radial direction. Further, a lower boss portion 23, which protrudes downward in the axial direction, is formed on the bottom of the motor casing 2. A lower damping member 5 is provided outside the lower boss portion 23 in the radial direction. Each of the upper and lower damping members 4 and 5 is formed of an annular elastic material. The upper and lower damping members 4 and 5 absorb vibration that is generated during the operation of the molded motor 100.

Furthermore, concave upper boss recesses 321 are formed on the outer peripheral surface of the upper boss portion 32. Convex rotation prevention portions 42, which are to be received in the upper boss recesses 321, are formed on the inner peripheral surface of the upper damping member 4. Likewise, concave lower boss recesses 231 are formed on the outer peripheral surface of the lower boss portion 23. Convex rotation prevention portions 52, which are to be received in the lower boss recesses 231, are formed on the inner peripheral surface of the lower damping member 5. For this reason, the upper and lower damping members 4 and 5 are mounted on the upper and lower boss portions 32 and 23 so as not to rotate.

A connector 6 is provided at a lower end portion of the outer peripheral surface of the motor casing 2. Further, a bearing conducting member 7, which extends in the vertical direction, is provided on the outer peripheral surface of the motor casing. Bearings (not shown), which are received in the upper and lower boss portions 32 and 23, are electrically connected to each other through the bearing conducting member 7. Accordingly, the deterioration of the bearings, which is caused by electrolytic corrosion, is suppressed.

Figure 3:
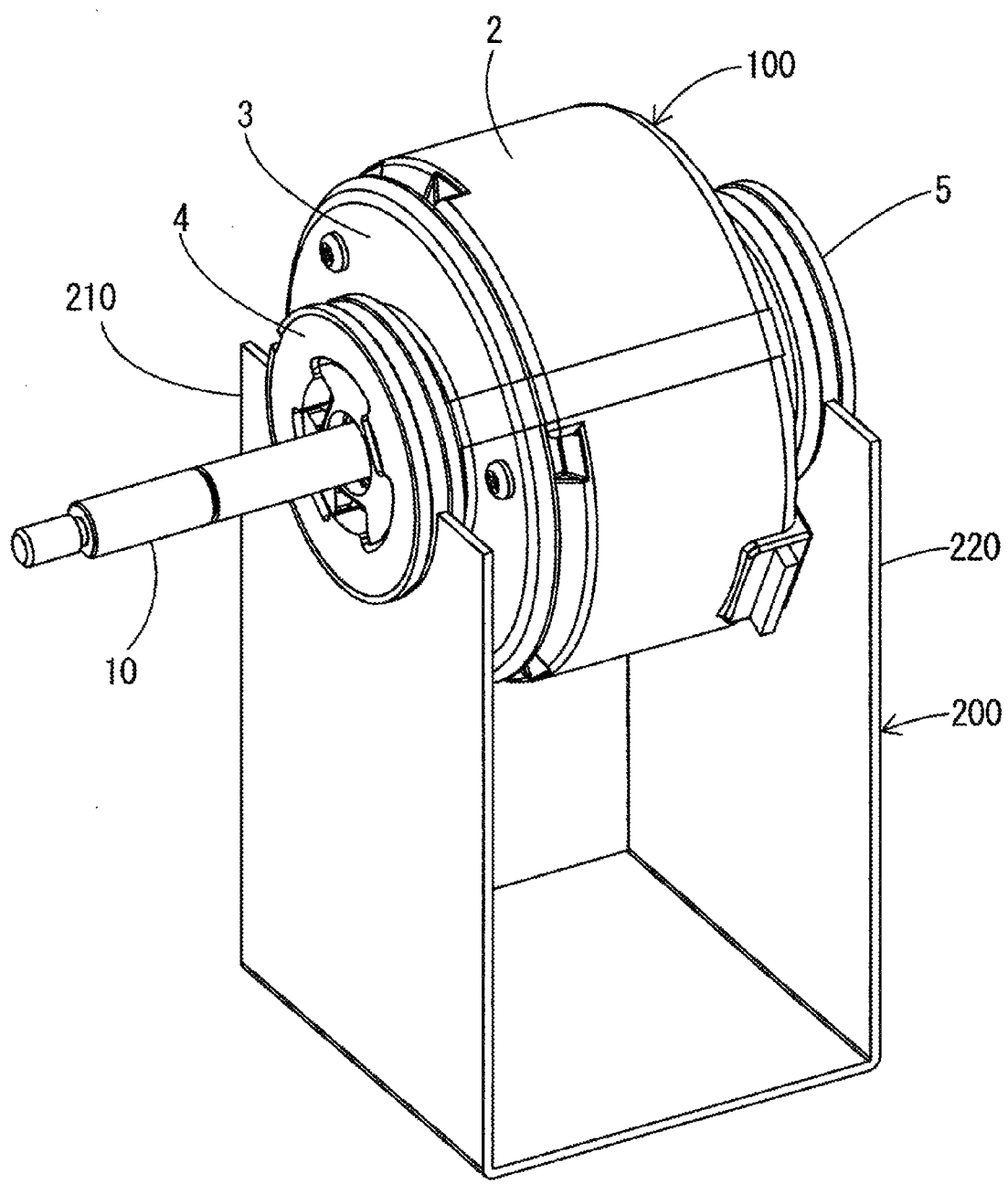
FIG. 3 is a perspective view of the molded motor 100 that is mounted on a motor mount 200.

FIG. 3 is a perspective view of the molded motor 100 that is mounted on a motor mount 200. The molded motor 100 is used while being mounted on the motor mount 200. The molded motor 100 is mounted on the motor mount 200 in a posture in which the shaft 10 is horizontal. At this time, the outer peripheral surfaces of the upper and lower damping members 4 and 5 are supported by holding portions 210 and 220 of the motor mount 200. For this reason, the vibration of the molded motor 100 is absorbed by the upper and lower damping members 4 and 5. Accordingly, the generation of noise, which is caused by the transmission of vibration to the motor mount 200, can be suppressed.

Figure 4:
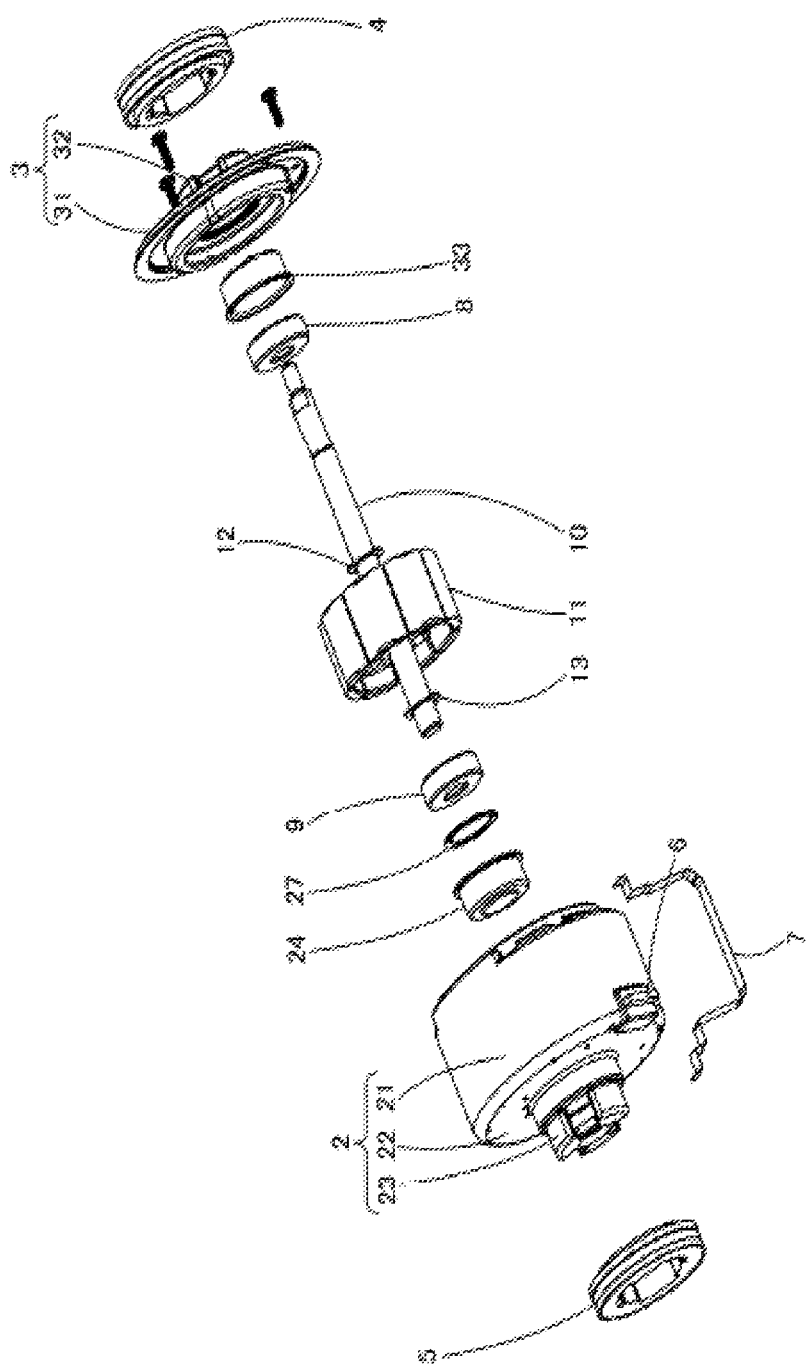
FIG. 4 is an exploded perspective view of the molded motor 100.
Figure 5:
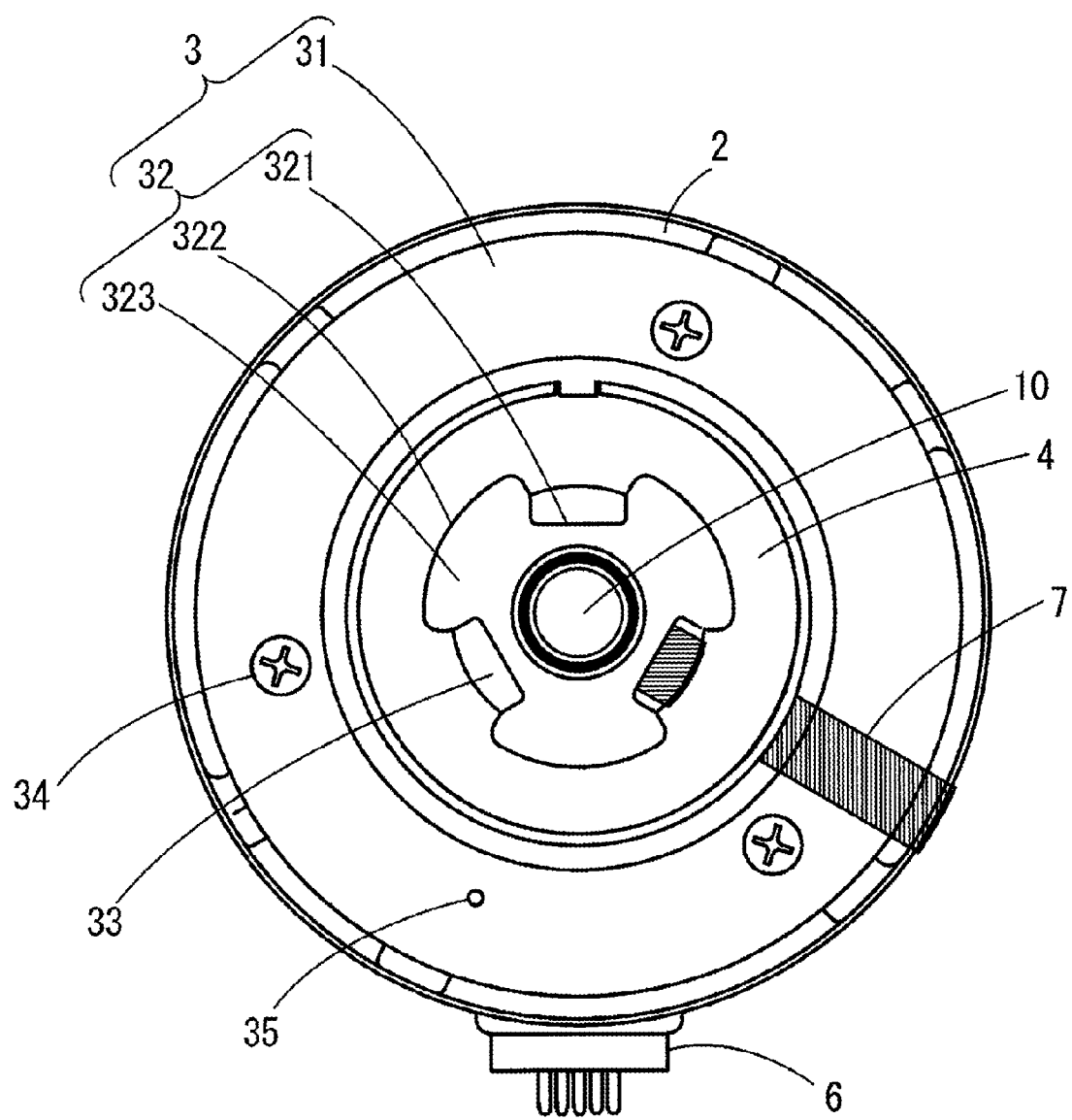
FIG. 5 is a plan view of the molded motor 100.
Figure 6:
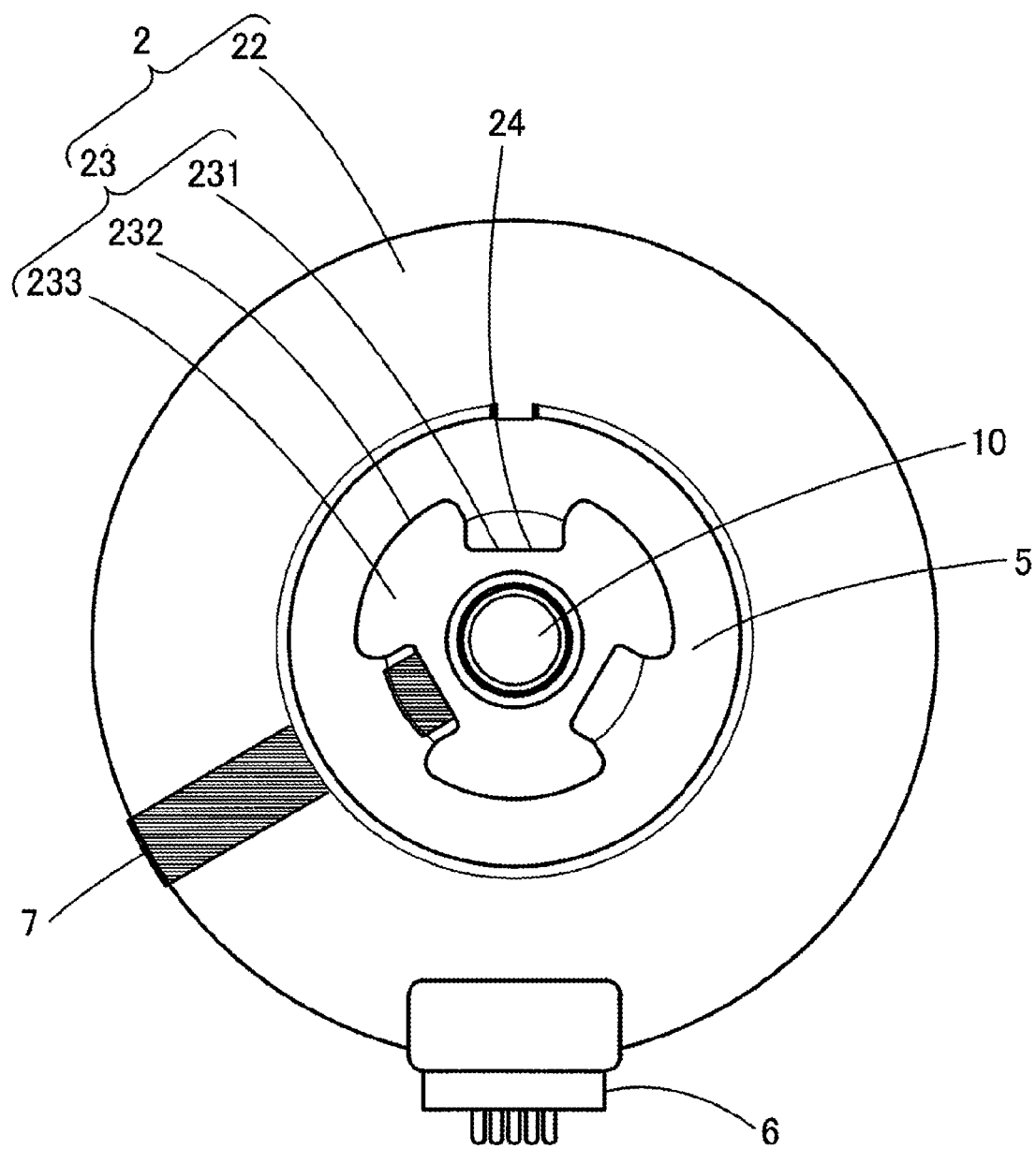
FIG. 6 is a bottom view of the molded motor 100.
Figure 7:
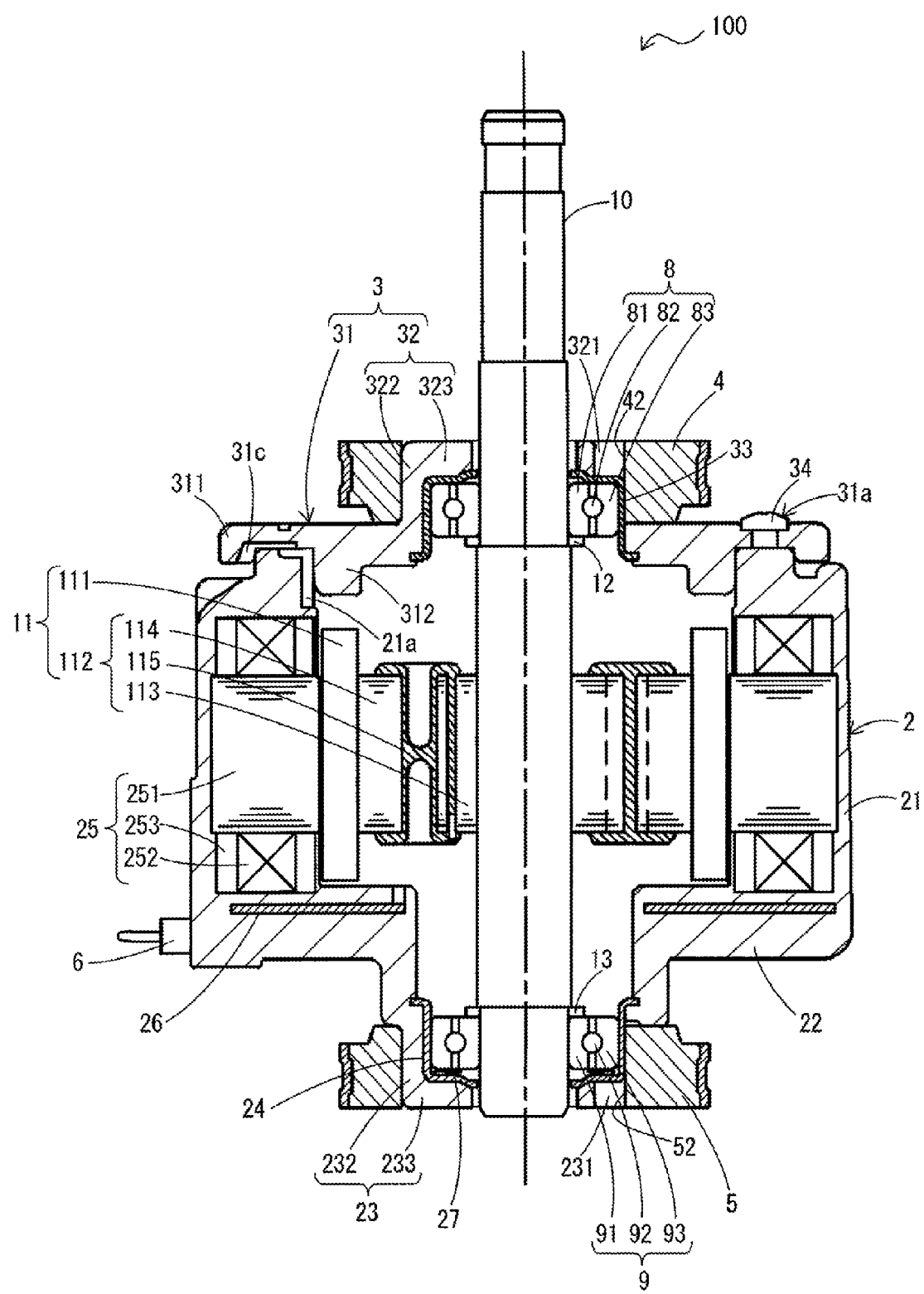
FIG. 7 is a cross-sectional view of the molded motor 100.

FIGS. 4 to 7 are views showing an example of the detailed configuration of the molded motor 100 according to the first embodiment of the invention. FIG. 4 is an exploded perspective view of the molded motor 100, and shows the aspect of the molded motor 100 in which the respective components are arrayed in an axial direction. FIG. 5 is a plan view of the molded motor 100, and shows the aspect of the molded motor 100 that is seen from above in the axial direction. FIG. 6 is a bottom view of the molded motor 100, and shows the aspect of the molded motor 100 that is seen from below in the axial direction. FIG. 7 is a cross-sectional view of the molded motor 100, and shows the cross-section of the molded motor 100 taken along a plane including the central axis J.

The molded motor 100 includes a stationary section that is fixed to the motor mount 200 of the driving unit and a rotating section that is rotatably supported by the stationary section. The rotating section includes the shaft 10 and a rotor 11. Meanwhile, the stationary section includes the motor casing 2, the casing cover 3, the upper damping member 4, the lower damping member 5, the connector 6, the bearing conducting member 7, an upper bearing bracket 33, and a lower bearing bracket 24. These respective components will be described in detail below.

<Shaft 10>

The shaft 10 is a substantially columnar member that extends in the axial direction (vertical direction) and is made of metal. The shaft 10 is supported by an upper bearing 8 and a lower bearing 9, and rotates about the central axis J. Further, retaining rings 12 and 13 for the upper and lower bearings 8 and 9 are provided on the shaft 10. An upper end portion of the shaft 10 protrudes upward from the upper boss portion 32 of the casing cover 3, and this protruding portion of the shaft 10 is connected to a driving part of the driving unit as an output shaft. Meanwhile, a lower end portion of the shaft 10 protrudes downward from the lower boss portion 23 of the motor casing 2, and this protruding portion of the shaft 10 may be connected to the driving part of the driving unit as an output shaft.

<Rotor 11>

The rotor 11 is a rotator that is fixed to the shaft 10 and rotates together with the shaft 10. The rotor 11 includes a rotor magnet 111 and a rotor holder 112. The rotor 11 is an insulating rotor that electrically insulates the rotor magnet 111 from the shaft 10. Meanwhile, a non-insulating rotor can be employed as the rotor 11. However, it is possible to suppress the deterioration of the bearing, which is caused by electrolytic corrosion, by employing an insulating rotor.

The rotor magnet 111 is a cylindrical permanent magnet, and is fixed to the outer peripheral surface of the rotor holder 112. Further, a magnetic pole face, which faces a stator 25 in the radial direction, is formed on the outside of the rotor magnet 111 in the radial direction. This magnetic pole face is magnetized so that magnetic pole regions of an N pole and magnetic pole regions of an S pole are alternately arranged in the circumferential direction.

The rotor holder 112 is a member that rotates together with the shaft 10, and includes an inner core portion 113, an outer core portion 114, and a connecting member 115. The inner core portion 113 is fixed to the shaft 10. The outer core portion 114 is disposed outside the inner core portion 113 in the radial direction. The connecting member 115 connects the inner core portion 113 and the outer core portion 114. Each of the inner and outer core portions 113 and 114 is a cylindrical metal member, and is formed of a laminated steel plate in which, for example, magnetic steel plates such as silicon steel plates are laminated in the axial direction. The connecting member 115 is made of an insulating material, for example, an insulating resin having a predetermined dielectric constant.

<Upper Bearing 8 and Lower Bearing 9>

The upper bearing 8 is a rolling bearing that is disposed above the rotor 11 and supports the shaft 10 so as to allow the shaft 10 to be rotatable. The upper bearing 8 shown in FIG. 7 is a ball bearing made of metal, and includes two or more rolling elements 82 and a pair of races, that is, an inner race 81 and an outer race 83. Each of the inner and outer races 81 and 83 is an annular metal member, and the outer race 83 is disposed outside the inner race 81 in the radial direction. The rolling elements 82 are spherical metal members, and are disposed between the outer peripheral surface of the inner race 81 and the inner peripheral surface of the outer race 83.

The lower bearing 9 is a rolling bearing that is disposed below the rotor 11 and supports the shaft 10 so as to allow the shaft 10 to be rotatable. The lower bearing 9 shown in FIG. 7 is a ball bearing made of metal, and includes two or more rolling elements 92 and a pair of races, that is, an inner race 91 and an outer race 93. Each of the inner and outer races 91 and 93 is an annular metal member, and the outer race 93 is disposed outside the inner race 91 in the radial direction. The rolling elements 92 are spherical metal members, and are disposed between the outer peripheral surface of the inner race 91 and the inner peripheral surface of the outer race 93. Meanwhile, sliding bearings may be used as the upper and lower bearings 8 and 9.

<Retaining Rings 12 and 13>

The retaining rings 12 and 13 are bearing stoppers that limit the movement of the upper and lower bearings 8 and 9 in the axial direction. The retaining rings 12 and 13 are formed of annular members, and are fixed in circumferential grooves that are formed on the outer peripheral surface of the shaft 10. The retaining ring 12 prevents the inner race of the upper bearing 8, which is inserted to the shaft 10, from moving downward in the axial direction. The retaining ring 13 prevents the inner race 91 of the lower bearing 9, which is inserted to the shaft 10, from moving upward in the axial direction.

<Motor Casing 2>

The motor casing 2 is a substantially bottomed cylindrical resin molded article that includes an opening formed at an upper portion thereof in the axial direction, and includes a cylindrical portion 21, a bottom wall portion 22, and the lower boss portion 23. The cylindrical portion 21 covers the outer periphery of the stator 25. The bottom wall portion 22 extends inward from the lower end of the cylindrical portion 21 in the radial direction. The lower boss portion 23 protrudes downward from the bottom of the bottom wall portion 22 in the axial direction. The bottom wall portion 22 is an annular plate-like body which is disposed below the stator 25 and of which the center is positioned on the central axis J. Further, a drain hole 21a is formed at the cylindrical portion 21 of the motor casing 2.

After the lower bearing bracket 24, the stator 25, and a circuit board 26 are inserted into a mold, a resin is injected into the mold. As a result, these components are embedded in the resin. The motor casing 2 is formed by a molding method of integrating these components with a resin, that is, so-called insert molding. An insulating resin is used as the resin of the motor casing 2.

The drain hole 21a includes a first groove that is formed on the inner peripheral surface of the cylindrical portion 21 and a second groove that is formed on the upper end face of the cylindrical portion 21. The first groove is formed as a recess that extends upward from the upper end of the stator 25 in the axial direction. The second groove is formed as a recess that is connected to the first groove and extends outward in the radial direction. Further, the second groove faces a drain hole 31c of the casing cover 3.

<Lower Boss Portion 23>

The lower boss portion 23 is a bearing receiving portion that receives the lower bearing 9, and the lower damping member 5 is mounted on the lower boss portion 23. The lower boss portion 23 includes a cylindrical portion 232 and a bottom portion 233. The cylindrical portion 232 extends downward in the axial direction. The bottom portion 233 extends inward from the lower end of the cylindrical portion 232 in the radial direction. Further, the lower bearing 9 is disposed inside the cylindrical portion 232 in the radial direction, and the lower damping member 5 is disposed outside the cylindrical portion 232 in the radial direction. Furthermore, two or more lower boss recesses 231, which prevent the lower damping member from rotating, are provided on the outer peripheral surface of the cylindrical portion 232.

The lower boss recesses 231 are recesses, that is, notches that are formed on the outer peripheral surface of the cylindrical portion 232. The lower boss recesses 231 are formed so that a part of the cylindrical portion 232 in the circumferential direction is recessed inward in the radial direction, and prevent the rotation of the lower damping member 5. Further, through holes are formed in the lower boss recesses 231, so that a part of the outer peripheral surface of the lower bearing bracket 24 present in the lower boss recesses 231 is exposed. Meanwhile, the specific shape and disposition of the lower boss recess 231 are arbitrary. Furthermore, the number of the lower boss recesses 231 is also arbitrary, and one or two or more lower boss recesses 231 may be formed. Meanwhile, a through hole has only to be formed in at least one of the two or more lower boss recesses 231.

The lower boss recesses 231 of this embodiment extend upward from the lower end of the cylindrical portion 232 in the axial direction. That is, the lower boss recesses 231 include notched regions that are formed at the bottom portion 233 of the lower boss portion 23 and directed to the inside from the outer peripheral edge of the bottom portion 233 in the radial direction. Further, the lower boss recesses 231 are formed as columnar spaces that extend upward from the notched regions in the axial direction. Furthermore, the lower boss recesses 231 are interposed between inner wall surfaces that face each other in the circumferential direction, and inner portions of the lower boss recesses 231 in the radial direction are open. Moreover, three lower boss recesses 231 are formed on the outer peripheral surface of the lower boss portion 23, and these lower boss recesses 231 are disposed at regular intervals in the circumferential direction. That is, the three lower boss recesses 231 are disposed at an interval of 120°.

<Lower Bearing Bracket 24>

The lower bearing bracket 24 is a bearing holding member that holds the lower bearing 9 and is made of metal. The lower bearing bracket 24 is disposed in the lower boss portion 23 of the motor casing 2. The lower bearing bracket 24 includes a cylindrical portion and a bottom portion. The cylindrical portion extends downward in the axial direction. The bottom portion extends inward from the lower end of the cylindrical portion in the radial direction. In addition, a rim portion, which extends outward in the radial direction, is provided at the upper end of the cylindrical portion. For example, the lower bearing bracket 24 is formed by pressing a metal plate such as a galvanized steel plate. Further, while the inner peripheral surface of the cylindrical portion is exposed and the rim portion is embedded in the inner peripheral surface of the lower boss portion 23, the lower bearing bracket 24 is disposed in the lower boss portion 23. The lower bearing 9 is inserted into the cylindrical portion of the lower bearing bracket 24 from above in the axial direction. The outer peripheral surface of the outer race 93 of the lower bearing 9 comes into contact with the inner peripheral surface of the cylindrical portion of the lower bearing bracket 24. The lower bearing 9 and the lower bearing bracket 24 are electrically connected to each other.

<Stator 25>

The stator 25 is an armature of the molded motor 100, and includes a stator core 251, a coil 252, and an insulator 253. The stator 25 is provided outside the rotor magnet 111 in the radial direction, and is formed in a substantially cylindrical shape. While the inner peripheral surface of the stator 25 is exposed, the stator 25 is embedded in the cylindrical portion 21 of the motor casing 2. Further, the inner peripheral surface of the stator 25 faces the outer peripheral surface of the rotor magnet 111 with a gap interposed therebetween.

The stator core 251 is formed of a laminated steel plate in which magnetic steel plates such as silicon steel plates are laminated in the axial direction. Each of the magnetic steel plates includes an annular core back and a plurality of magnetic pole teeth that protrude inward from the core back in the radial direction. That is, the inner peripheral surface of the stator 25 is formed by the end faces of the magnetic pole teeth.

The coil 252 is a wire that is wound on the magnetic pole teeth of the stator core 251 with the insulator 253 interposed between the coil and the magnetic pole teeth. When driving current is supplied to the coil 252, radial magnetic flux is generated in the magnetic pole teeth that are magnetic cores. For this reason, circumferential torque is generated between the magnetic pole teeth and the rotor magnet 111, so that the shaft 10 rotates about the central axis J. The insulator 253 is a member that is made of a resin and electrically insulates the stator core 251 from the coil 252.

<Circuit Board 26>

An electronic circuit that supplies driving current to the coil 252 and a magnetic sensor that detects the rotational position of the rotor 11 are mounted on the circuit board 26. Further, the circuit board 26 is electrically connected to the connector 6. The circuit board 26 is embedded in the bottom wall portion 22 of the motor casing 2 and is formed substantially in the shape of a disc. Furthermore, the circuit board 26 is provided with a through hole through which the shaft 10 passes.

<Preload Member 27>

A preload member 27 is an elastic member that applies a preload to the upper and lower bearings 8 and 9, and, for example, a wave washer is used as the preload member 27. The preload member 27 is disposed between the outer race 93 of the lower bearing 9 and the bottom portion of the lower bearing bracket 24.

<Casing Cover 3>

The casing cover 3 is a disc-shaped resin molded article that covers the opening of the motor casing 2, and an insulating resin is used for the casing cover 3. For example, the same resin as the mold resin of the motor casing 2 is used for the casing cover 3. Since the casing cover 3 is made of a resin, a damping property and a sound insulation property can be improved further than those in a case in which the casing cover 3 is made of metal. The casing cover 3 includes a top wall portion 31 and an upper boss portion 32. The top wall portion 31 extends inward from an edge of an opening of the stator 25 in the radial direction. The upper boss portion 32 protrudes upward from an upper surface of the top wall portion 31 in the axial direction, and is formed in the shape of a cylinder having a lid.

<Top Wall Portion 31>

The top wall portion 31 is an annular plate-like body which is disposed above the stator 25 and of which the center is positioned on the central axis J. An outer peripheral edge portion 311, a press-fitting portion 312, screw holes 31a, the drain hole 31c, and a misplacement preventing hole 35 are formed at the top wall portion 31. The outer diameter of the top wall portion 31 is smaller than the outer diameter of the cylindrical portion 21 of the motor casing 2. For this reason, the bearing conducting member 7 comes off between the motor casing 2 and the casing cover 3, so that it is possible to allow the bearing conducting member 7 to be easily separated.

The outer peripheral edge portion 311 includes the outer peripheral edge of the top wall portion 31, faces the upper end face of the cylindrical portion 21 of the motor casing 2, and is formed in an annular shape. The press-fitting portion 312 is formed in the shape of a cylinder that protrudes downward from the lower surface of the top wall portion 31 in the axial direction. Further, the press-fitting portion 312 protrudes further downward than the lower end of the outer peripheral edge portion 311 in the axial direction, and is press-fitted to the inner peripheral surface of the cylindrical portion 21.

The screw holes 31a and screws 34 are fastening means for fastening the motor casing 2 to the casing cover 3. Two or more screw holes are disposed at the top wall portion 31 in the circumferential direction. The screw holes 31a pass through the top wall portion 31 in the axial direction. The casing cover 3 is fixed to the motor casing 2 by the screws 34 that pass through the screw holes 31a.

The drain hole 31c is a groove that is formed on the lower surface of the outer peripheral edge portion 311. The drain hole 31c extends outward from a position, which faces the drain hole 21a of the motor casing 2, in the radial direction. The drain hole 31c is a long and narrow recess that reaches the outside of the cylindrical portion 21 of the motor casing 2.

The misplacement preventing hole 35 is a recess that is recessed downward from an upper surface of the top wall portion 31 in the axial direction, and is disposed at a position that faces a protrusion of the motor casing 2. For example, a misplacement preventing protrusion of the motor casing 2 is the connector 6 that is provided at the lower end portion of the cylindrical portion 21 and protrudes outward from the outer peripheral surface of the cylindrical portion 21 in the radial direction.

<Upper Boss Portion 32>

The upper boss portion 32 is a bearing receiving portion that receives the upper bearing 8, and the upper damping member 4 is mounted on the upper boss portion 32. The upper boss portion 32 includes a cylindrical portion 322 that extends upward in the axial direction and a top lid portion 323 that extends inward from the upper end of the cylindrical portion 322 in the radial direction. Further, the upper bearing 8 is disposed inside the cylindrical portion 322 in the radial direction, and the upper damping member 4 is disposed outside the cylindrical portion 322 in the radial direction. Furthermore, two or more upper boss recesses 321, which prevent the upper damping member 4 from rotating, are formed on the outer peripheral surface of the cylindrical portion 322.

The upper boss recesses 321 are recesses, that is, notches that are formed on the outer peripheral surface of the cylindrical portion 322. The upper boss recesses 321 are formed in a shape in which a part of the cylindrical portion 322 in the circumferential direction is recessed inward in the radial direction, and prevent the rotation of the upper damping member 4. Further, through holes are formed in the upper boss recesses 321, so that a part of the outer peripheral surface of the upper bearing bracket 33 present in the upper boss recesses 321 is exposed. Meanwhile, the specific shape and disposition of the upper boss recess 321 are arbitrary. Furthermore, the number of the upper boss recesses 321 is also arbitrary, and one or two or more upper boss recesses 321 may be formed. Meanwhile, a through hole has only to be formed in at least one of the two or more upper boss recesses 321.

The upper boss recesses 321 of this embodiment are formed as recesses that extend downward from the upper end of the cylindrical portion 322 in the axial direction. That is, notched regions that are directed to the inside from the outer peripheral edge of the top lid portion 323 in the radial direction are formed at the top lid portion 323 of the upper boss portion 32. In addition, the upper boss recesses 321 are formed as columnar spaces that extend downward from the notched regions in the axial direction. Further, the upper boss recesses 321 are interposed between inner wall surfaces that face each other in the circumferential direction, and inner portions of the upper boss recesses 321 in the radial direction are open. Moreover, three upper boss recesses 321 are formed on the outer peripheral surface of the upper boss portion 32, and these upper boss recesses 321 are disposed at regular intervals in the circumferential direction. That is, the three upper boss recesses 321 are disposed at an interval of 120°.

<Upper Bearing Bracket 33>

The upper bearing bracket 33 is a bearing holding member that holds the upper bearing 8 and is made of metal. The upper bearing bracket 33 is disposed in the upper boss portion 32 of the casing cover 3. The upper bearing bracket 33 includes a cylindrical portion that extends upward in the axial direction and a lid portion that extends inward from the upper end of the cylindrical portion in the radial direction. In addition, a rim portion, which extends outward in the radial direction, is provided at the lower end of the cylindrical portion. For example, the upper bearing bracket 33 is formed by pressing a metal plate such as a galvanized steel plate. Further, while the inner peripheral surface of the cylindrical portion is exposed and the rim portion is embedded in the inner peripheral surface of the upper boss portion 32, the upper bearing bracket 33 is disposed in the upper boss portion 32. The upper bearing 8 is inserted into the cylindrical portion of the upper bearing bracket 33 from below in the axial direction. The outer peripheral surface of the outer race 83 of the upper bearing 8 comes into contact with the inner peripheral surface of the cylindrical portion of the upper bearing bracket 33. The upper bearing 8 and the upper bearing bracket 33 are electrically connected to each other.

<Bearing Conducting Member 7>

The bearing conducting member 7 allows the upper and lower bearings 8 and 9 to be electrically connected to each other by allowing the upper and lower bearing brackets 33 and 24 to be electrically connected to each other through an outer portion of the motor casing 2 in the radial direction. For example, a belt-like conductive tape, which is formed by applying an adhesive to metallic foil such as copper and has flexibility, is used as the bearing conducting member 7.

The bearing conducting member 7 is disposed along the upper surface of the top wall portion 31 of the casing cover 3, the outer peripheral surface of the cylindrical portion 21 of the motor casing 2, and the lower surface of the bottom wall portion 22 of the motor casing 2. The upper end of the bearing conducting member 7 comes into contact with the outer peripheral surface of the upper bearing bracket 33 that is exposed from the upper boss recess 321. Further, the lower end of the bearing conducting member 7 comes into contact with the outer peripheral surface of the lower bearing bracket 24 that is exposed from the lower boss recess 231. Furthermore, the bearing conducting member 7 is disposed at a circumferential position where the lower surface of the outer peripheral edge portion 311 of the top wall portion 31 and the upper end face of the cylindrical portion 21 of the motor casing 2 come into contact with each other.

<Upper Damping Member 4 and Lower Damping Member 5>

Figure 8:
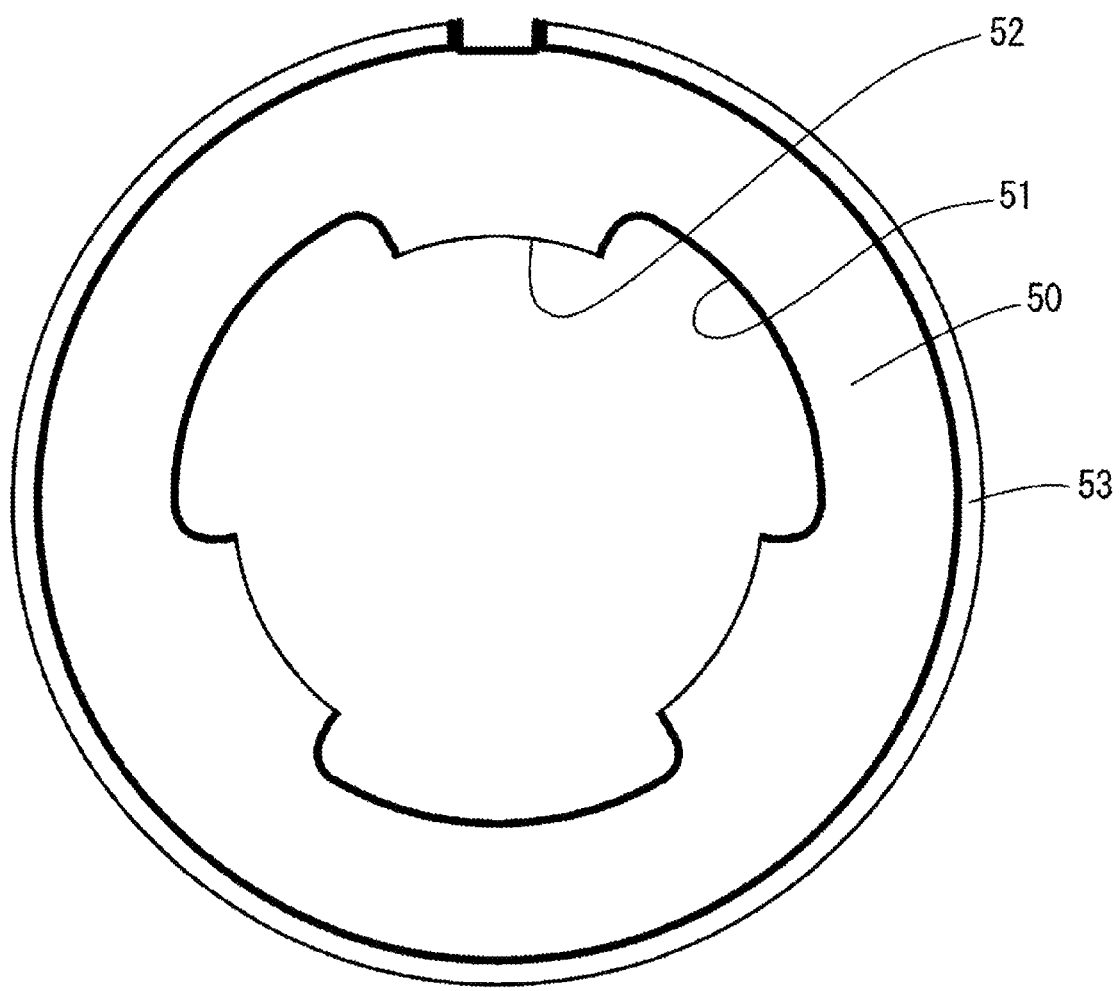
FIG. 8 is a view showing a lower damping member 5.

FIG. 8 is a view showing the lower damping member 5, and shows the appearance of the lower damping member that is seen from below in the axial direction. Since the upper and lower damping members 4 and 5 have the same structure, only the structure of the lower damping member 5 will be described here. Meanwhile, the upper and lower damping members 4 and 5 may not have the same structure.

The lower damping member 5 includes a cylindrical body portion 50 and a frame 53 that is formed so as to surround the outer periphery of the body portion 50 and is made of metal. The body portion 50 is made of elastic rubber having high elasticity. The frame 53 is a reinforcement member that reinforces the body portion 50. For example, the frame 53 is formed by bending a belt-like metal plate.

The body portion 50 is provided with two or more rotation prevention portions 52 that are to be received in the lower boss recesses 231. The rotation prevention portions 52 are protrusions formed on an inner peripheral surface 51, and are formed so as to protrude inward from the inner peripheral surface 51 in the radial direction. The respective rotation prevention portions 52 are disposed on the inner peripheral surface 51 at regular intervals in the circumferential direction.

The lower end portion of the bearing conducting member 7 is disposed on the outer peripheral surface of the lower bearing bracket 24 that is exposed from the lower boss recess 231, and is covered with the radially inner portion of the rotation prevention portion 52 of the lower damping member 5. For example, the lower end portion of the bearing conducting member 7 comes into contact with the lower bearing bracket 24 in the lower boss recess 231, and the rotation prevention portion 52 of the lower damping member 5 comes into contact with the lower end portion of the bearing conducting member 7.

The upper end portion of the bearing conducting member 7 is disposed on the outer peripheral surface of the upper bearing bracket 33 that is exposed from the upper boss recess 321, and is covered with the radially inner portion of the rotation prevention portion 42 of the upper damping member 4. For example, the upper end portion of the bearing conducting member 7 comes into contact with the upper bearing bracket 33 in the upper boss recess 321, and the rotation prevention portion 42 of the upper damping member 4 comes into contact with the upper end portion of the bearing conducting member 7.

<Lower Surface of Casing Cover 3>

Figure 9:
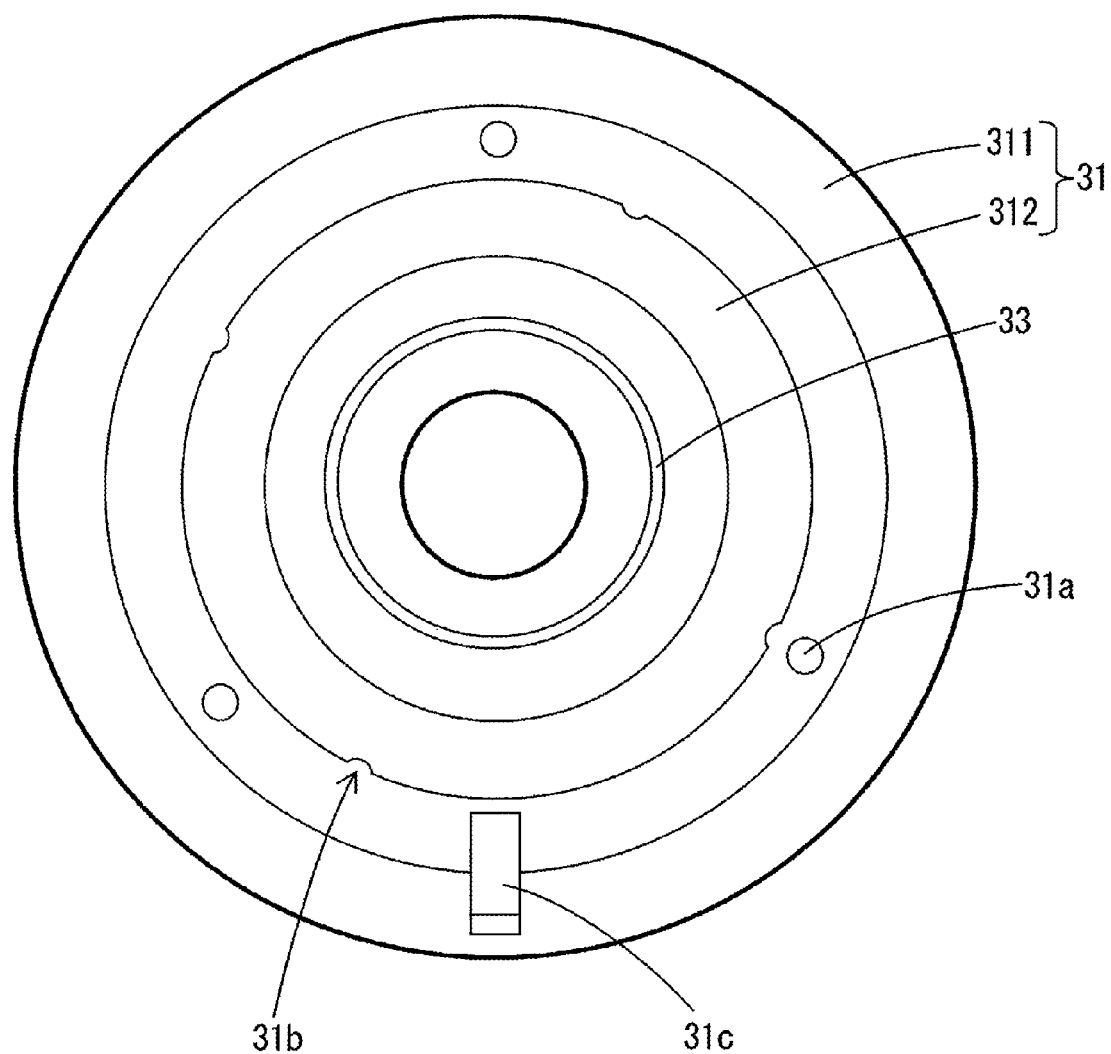
FIG. 9 is a view showing the lower surface of a casing cover 3.

FIG. 9 is a view showing the lower surface of the casing cover 3, and shows the appearance of the casing cover 3 that is seen from below. The plurality of screw holes 31a are disposed at the top wall portion 31 of the casing cover 3. For the prevention of cracks in the casing cover 3, two or more press-fitting recesses 31b are formed at the press-fitting portion 312. The press-fitting recesses 31b are formed so as to be recessed inward from the outer peripheral surface of the press-fitting portion 312 in the radial direction.

For example, the press-fitting recesses 31b are formed in the shape of a groove that extends upward from the lower end of the press-fitting portion 312 in the axial direction. The respective press-fitting recesses 31b are disposed on the outer peripheral surface of the press-fitting portion 312 at regular intervals in the circumferential direction. That is, four press-fitting recesses 31b are disposed at an interval of 90°.

The respective components of the molded motor 100 according to this embodiment are formed as described above. A relationship between these components and effects generated by the components will be described in detail below.

(1) Prevention of Rotation of Damping Member

In the molded motor 100 according to this embodiment, the rotation prevention portions 52 of the lower damping member 5 are received in the lower boss recesses 231 of the lower boss portion 23. For this reason, when the lower damping member 5 rotates relative to the lower boss portion 23, side walls of the rotation prevention portions 52 come into contact with inner wall surfaces of the lower boss recesses 231. Accordingly, it is possible to limit the rotation of the lower damping member 5 relative to the motor casing 2 in the molded motor 100.

Further, in the molded motor 100, the rotation prevention portions 42 of the upper damping member 4 are received in the upper boss recesses 321 of the upper boss portion 32. For this reason, when the upper damping member 4 rotates relative to the upper boss portion 32, side walls of the rotation prevention portions 42 come into contact with inner wall surfaces of the upper boss recesses 321. Accordingly, it is possible to limit the rotation of the upper damping member 4 relative to the casing cover 3 in the molded motor 100.

Furthermore, the lower boss recesses 231 are formed in the shape of a notch that extends upward from the lower end of the lower boss portion 23 in the axial direction. For this reason, when the motor casing 2 is molded with a resin, the motor casing 2 is easily extracted from the mold in the axial direction. For this reason, it is possible to improve the workability of the motor casing 2 in the molded motor 100.

Moreover, the respective lower boss recesses 231 are disposed at regular intervals in the circumferential direction. For this reason, if the lower damping member 5 is rotated by a maximum angle of 120° when the lower damping member 5 is disposed on the lower boss portion 23, it is possible to adjust the circumferential position of the lower damping member 5 with respect to the lower boss portion 23. Accordingly, it is possible to improve workability when the lower damping member 5 is disposed on the lower boss portion 23 in the molded motor 100. Further, since the lower boss portion 23 of the molded motor 100 is uniformly supported by the lower damping member 5, it is possible to suppress the occurrence of a deviation in a force that is applied in the circumferential direction between the lower boss portion 23 and the lower damping member 5.

Furthermore, the upper boss recesses 321 are formed in the shape of a notch that extends downward from the upper end of the upper boss portion 32 in the axial direction. Accordingly, when the casing cover 3 is molded with a resin, the casing cover 3 is easily extracted from the mold in the axial direction. For this reason, it is possible to improve the workability of the casing cover 3 in the molded motor 100.

Further, the respective upper boss recesses 321 are disposed at regular intervals in the circumferential direction. For this reason, if the upper damping member 4 is rotated by a maximum angle of 120° when the upper damping member 4 is disposed on the upper boss portion 32, it is possible to adjust the circumferential position of the upper damping member 4 with respect to the upper boss portion 32. Furthermore, since the upper boss portion 32 is uniformly supported by the upper damping member 4, it is possible to suppress the occurrence of a deviation in pressure that is applied to the upper damping member 4 from the upper boss portion 32 in the radial direction.

(2) Countermeasure Against Electrolytic Corrosion of Bearing

For example, a drive signal, which has been subjected to pulse-width modulation, is supplied to an inverter circuit mounted on the circuit board 26, so that the molded motor 100 is driven. A drive voltage of the molded motor 100 is raised to satisfy a demand for high efficiency. Further, the carrier frequency of a drive signal of the molded motor 100 is raised in order to obtain an ideal sine wave in achieving low vibration and low noise.

However, in the case of the molded motor 100, the upper bearing bracket 33 and the coil 252 of the stator 25 are disposed with a molded resin interposed therebetween. For this reason, the upper bearing bracket 33 and the coil 252 function as a capacitative element that has predetermined capacitance. Accordingly, when a voltage at the neutral point of the coil 252 rises, charges are accumulated in the capacitative element. In this case, when a voltage applied to the upper bearing 8, that is, a shaft voltage exceeds a dielectric breakdown voltage of an oil film present in the bearing, minute current flows in a circulation path that reaches the shaft 10 from the shaft 10 through the rotor 11, the stator 25, the mold resin, the upper bearing bracket 33, and the upper bearing 8. When current flows in the upper bearing 8, sparks are generated in gaps between the inner or outer race 81 or 83 and the rolling elements 82. For this reason, so-called electrolytic corrosion in which the surface of the upper bearing 8 is damaged occurs, so that the life of the upper bearing 8 is shortened.

Capacitance is also formed between the lower bearing bracket 24 and the circuit board 26, similar to between the upper bearing bracket 33 and the coil 252. For this reason, when a shaft voltage applied to the lower bearing 9 exceeds a dielectric breakdown voltage of an oil film present in the bearing, minute current flows in a circulation path that reaches the shaft 10 from the shaft 10 through the rotor 11, the stator 25, the circuit board 26, the mold resin, the lower bearing bracket 24, and the lower bearing 9.

In the molded motor 100 according to this embodiment, the bearing conducting member 7 electrically connects the upper bearing bracket 33 to the lower bearing bracket 24. For this reason, the electrical potential of the upper bearing bracket 33 is equal to that of the lower bearing bracket 24. Accordingly, even when the capacitance on the upper bearing bracket 33 is significantly different from the capacitance on the lower bearing bracket 24, it is possible to reduce the shaft voltages that are applied to the upper and lower bearings 8 and 9. As a result, the electrolytic corrosion of the upper and lower bearings 8 and 9 is suppressed.

Further, in the molded motor 100, the inner and outer core portions 113 and 114 are electrically insulated from each other by the connecting member 115. For this reason, the impedance of the rotor 11 is higher than the impedance of a rotor in a case in which the connecting member 115 is not provided. Accordingly, it is possible to make the shaft voltages, which are applied to the upper and lower bearings 8 and 9, be relatively low in the molded motor 100.

Furthermore, since the casing cover 3 is made of a resin, an insulating property between the upper bearing 8 and the stator 25 is higher than that in the case in which the casing cover 3 is made of metal. For this reason, the electrolytic corrosion of the upper bearing 8 is suppressed. Moreover, since the bearing conducting member 7 comes into direct contact with the upper and lower bearing brackets 33 and 24, it is possible to make the upper and lower bearing brackets 33 and 24 be electrically connected to each other well in the molded motor 100 as compared to a case in which the bearing conducting member 7 comes into indirect contact with the upper and lower bearing brackets 33 and 24 with other members interposed therebetween.

Further, the bearing conducting member 7 is disposed outside the motor casing 2 in the radial direction. For this reason, it is not necessary to consider the contact between the bearing conducting member 7 and the rotor 11, the insulation of the bearing conducting member 7 from the stator 25, and the like, unlike in a case in which the bearing conducting member 7 is disposed inside the motor casing 2 in the radial direction. Accordingly, the structure of the molded motor 100 is simplified, so that it is possible to reduce the number of components and to manufacture the molded motor 100 at a low cost.

(3) Prevention of Peeling of Bearing Conducting Member 7

The bearing conducting member 7 of the molded motor 100 according to this embodiment is a conductive tape, and the conductive tape is disposed between the screw holes 31$a$ on the upper surface of the top wall portion 31. For this reason, the conductive tape does not close the screw hole 31$a$, and it is possible to improve workability when the bearing conducting member 7 is disposed on the casing cover 3 and the motor casing 2.

Furthermore, the lower end portion of the conductive tape is covered with the radially inner portion of the rotation prevention portion 52 of the lower damping member 5. For this reason, in the molded motor 100, it is possible to make the conductive tape be difficult to be peeled from the outer peripheral surface of the lower bearing bracket 24 in the lower boss recess 231. In particular, since the rotation prevention portion 52 of the lower damping member 5 comes into contact with the lower end portion of the conductive tape, it is possible to prevent the conductive tape from being peeled from the outer peripheral surface of the lower bearing bracket 24.

Further, the upper end portion of the conductive tape is covered with the radially inner portion of the rotation prevention portion 42 of the upper damping member 4. For this reason, in the molded motor 100, it is possible to make the conductive tape be difficult to be peeled from the outer peripheral surface of the upper bearing bracket 33 in the upper boss recesses 321. In particular, since the rotation prevention portion 42 of the upper damping member 4 comes into contact with the upper end portion of the conductive tape, it is possible to prevent the conductive tape from being peeled from the outer peripheral surface of the upper bearing bracket 33.

Furthermore, the outer diameter of the top wall portion 31 is smaller than the outer diameter of the cylindrical portion 21 of the motor casing 2. For this reason, since a gap is not easily formed between the outer peripheral edge portion 311 of the top wall portion 31 and the upper end portion of the cylindrical portion 21 in the molded motor 100, the peeling of the conductive tape can be prevented. Moreover, the conductive tape is disposed at a circumferential position where the lower surface of the outer peripheral edge portion 311 of the top wall portion 31 and the upper end face of the cylindrical portion 21 of the motor casing 2 come into contact with each other. For this reason, it is possible to make a gap be more difficult to be formed between the outer peripheral edge portion 311 and the cylindrical portion 21.

(4) Prevention of Puddle in Casing Cover 3

In the molded motor 100 according to this embodiment, the upper surface of the top wall portion 31 is formed in a flat shape. For this reason, when the molded motor 100 is used while the upper surface of the casing cover 3 faces upward in the vertical direction, it is possible to prevent water from being accumulated on the upper surface of the casing cover 3 of the molded motor 100.

(5) Prevention of Cracks in Casing Cover 3

In the molded motor 100 according to this embodiment, a plurality of press-fitting recesses 31$b$ are formed at the press-fitting portion 312. For this reason, the strength of the press-fitting portion 312 against a radially inward force is increased in the molded motor 100 when the press-fitting portion 312 is press-fitted to the inner peripheral surface of the cylindrical portion 21 of the motor casing 2. For this reason, it is possible to prevent cracks from being formed in the casing cover 3.

(6) Drain Hole of Casing Cover 3

In the molded motor 100 according to this embodiment, the drain hole 31$c$ is formed at the outer peripheral edge portion 311 of the top wall portion 31. For this reason, it is possible to discharge water, which infiltrates into the cylindrical portion 21 of the motor casing 2 of the molded motor 100, to the outside.

(7) Misplacement Preventing Structure of Casing Cover 3

In the molded motor 100 according to this embodiment, a recess, which is recessed upward in the axial direction, that is, the drain hole 31$c$ is formed on the lower surface of the top wall portion 31. For this reason, when the casing cover 3 is fixed to the motor casing 2, it is possible to prevent the circumferential position of the casing cover 3 from being incorrectly placed in the molded motor 100.

Further, a recess, which is recessed downward in the axial direction, that is, the misplacement preventing hole 35 is formed on the upper surface of the top wall portion 31. For this reason, when the casing cover 3 of the molded motor 100 is fixed to the motor casing 2 or the molded motor 100 is disposed on the motor mount 200, it is possible to prevent the circumferential position of the casing cover 3 from being incorrectly placed or to prevent the circumferential position of the molded motor 100 from being incorrectly placed.

A misplacement preventing structure may include a protrusion that is formed on the upper surface of the casing cover 3 and protrudes upward in the axial direction, or a protrusion that is formed on the lower surface of the casing cover 3 and protrudes downward in the axial direction. Furthermore, the misplacement preventing structure may include two or more recesses or protrusions for preventing misplacement, and may be adapted so that the recesses or the protrusions are disposed at unequal intervals in the circumferential direction.

Meanwhile, an example of a case in which the upper surface of the top wall portion 31 is formed in a flat shape has been described in the first embodiment. However, in order to prevent water from being accumulated on the upper surface of the casing cover 3, the lower end portion of the upper boss portion 32 may be present at the same position as the position of the upper end portion of the outer peripheral edge portion 311 of the top wall portion 31 on the upper surface of the casing cover 3 in the vertical direction or may be positioned above the upper end portion.

Figure 10:
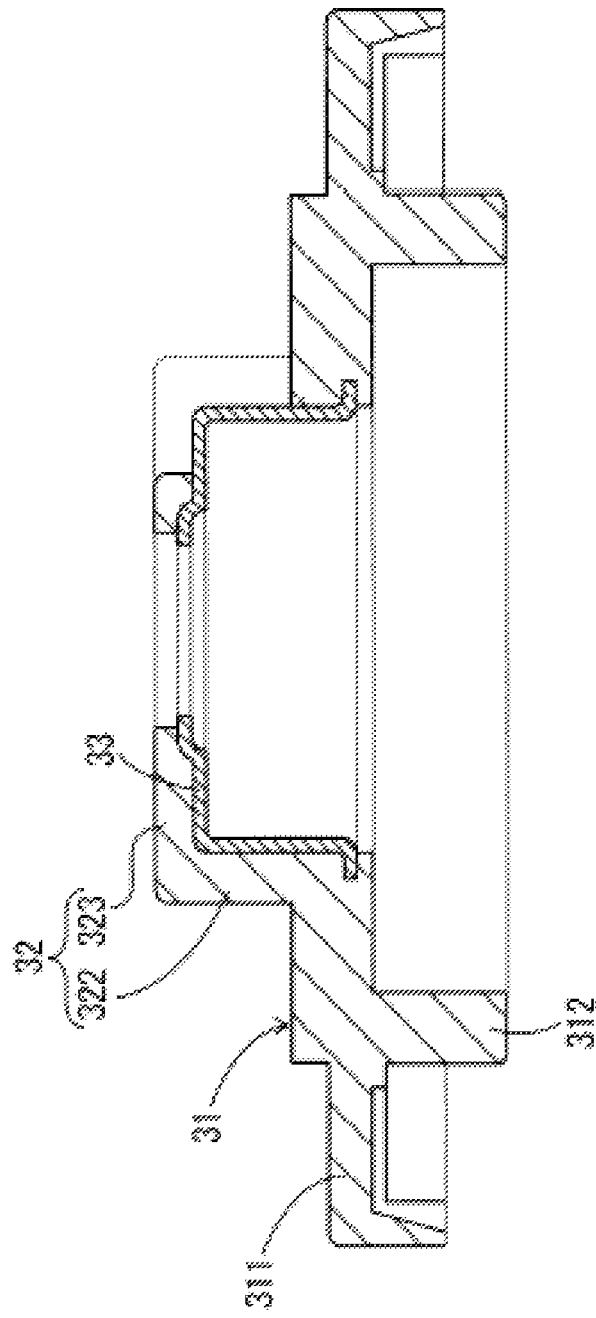
FIG. 10 is a cross-sectional view showing another example of the structure of the casing cover 3.

FIG. 10 is a cross-sectional view showing another example of the structure of the casing cover 3, and shows a case in which a difference in level is formed between the outer peripheral edge portion 311 of the top wall portion 31 and the upper boss portion 32. The difference in level is formed between the cylindrical portion 322 of the upper boss portion 32 and the outer peripheral edge portion 311.

Figure 11:
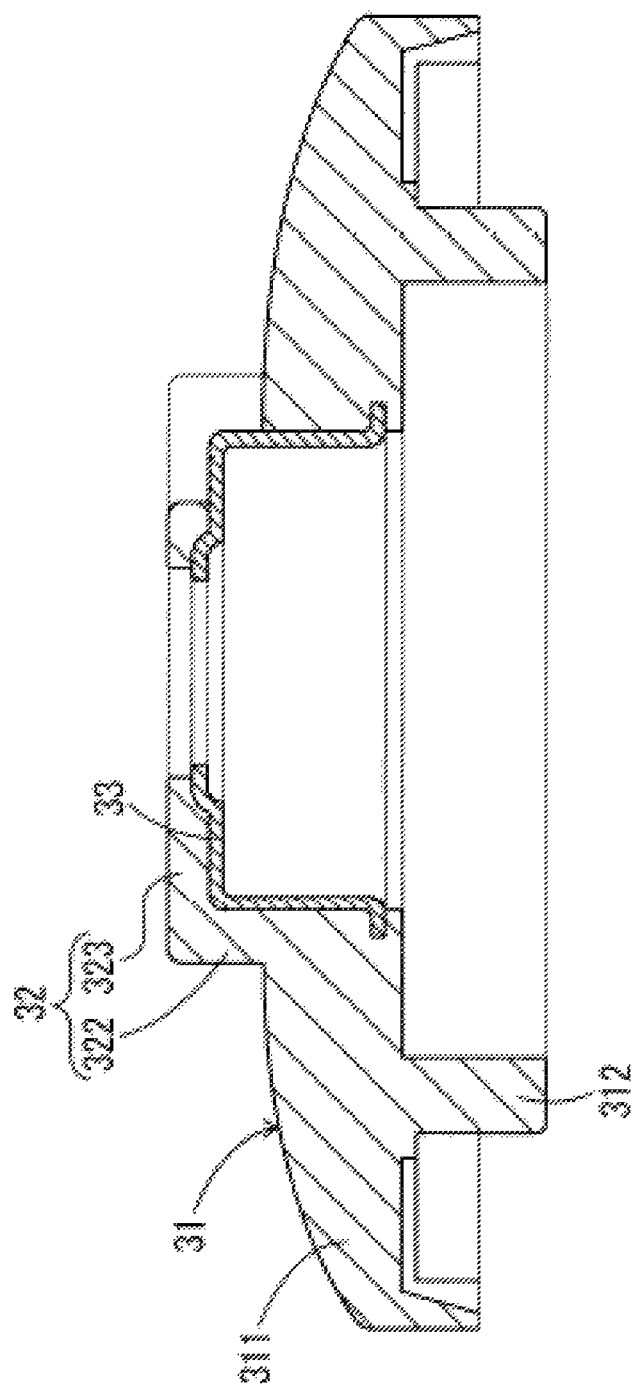
FIG. 11 is a cross-sectional view showing still another example of the structure of the casing cover 3.

FIG. 11 is a cross-sectional view showing still another example of the structure of the casing cover 3, and shows a case in which a gently inclined surface is formed between the outer peripheral edge portion 311 of the top wall portion 31 and the upper boss portion 32. The inclined surface of the top wall portion 31 is formed in the shape of a wall surface that is lowered downward in the axial direction radially toward the outside. Since the lower end portion of the upper boss portion 32 of the molded motor 100 shown in FIGS. 10 and 11 is present above the upper end portion of the outer peripheral edge portion 311 of the top wall portion 31, it is possible to prevent water from being accumulated on the upper surface of the casing cover 3.

Second Embodiment

An example of a case in which the peeling of the conductive tape is prevented by making the outer diameter of the top wall portion 31 smaller than the outer diameter of the cylindrical portion 21 of the motor casing 2 has been described in the first embodiment. In contrast, a case in which the peeling of a conductive tape is prevented by forming an inclined surface on the outer peripheral edge portion 311 of the top wall portion 31 will be described in this embodiment. Meanwhile, the repeated description of the same components as the components of the molded motor 100 according to the above-mentioned first embodiment will be omitted.

Figure 12:
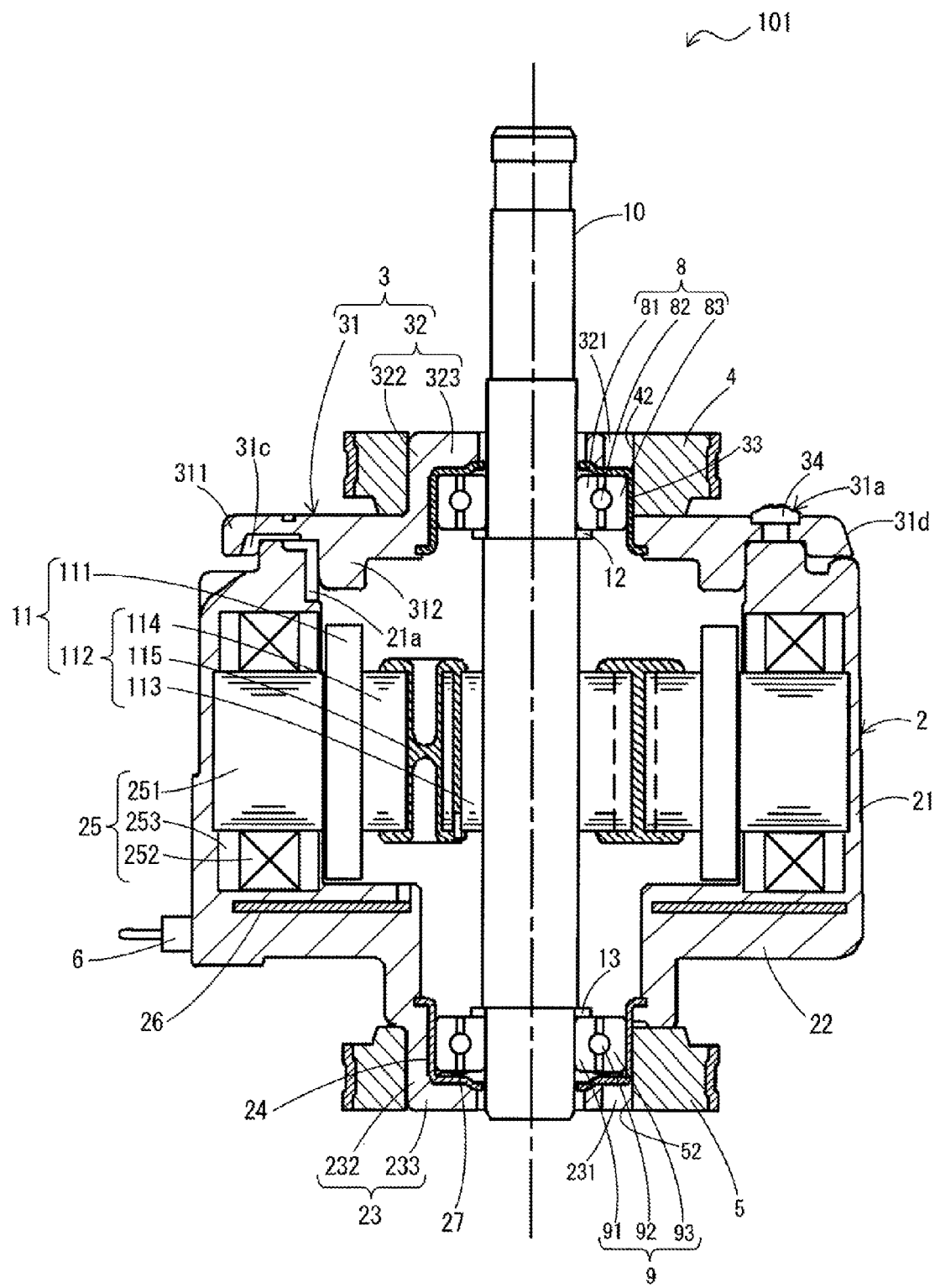
FIG. 12 is a cross-sectional view showing an example of the structure of a molded motor 101 according to a second embodiment.

FIG. 12 is a cross-sectional view showing an example of the structure of a molded motor 101 according to a second embodiment of the invention. In comparison with the molded motor 100 of FIG. 7, the molded motor 101 is different from the molded motor 100 in that an inclined surface 31d is formed on the top wall portion 31 of the casing cover 3. The inclined surface 31d is formed in the shape of a wall surface that is lowered downward in the axial direction radially toward the outside. For example, the inclined surface 31d is formed at a part of the outer peripheral edge portion 311 of the top wall portion 31 in the circumferential direction. A conductive tape (not shown) is disposed at the position of the inclined surface 31d.

Since a gap is not easily formed between the outer peripheral edge portion 311 of the top wall portion 31 and the upper end portion of the cylindrical portion 21 in the molded motor 101 according to this embodiment, the peeling of the conductive tape can be prevented.

Third Embodiment

An example of a case in which the casing cover 3 is made of a resin and the upper bearing bracket 33 is received in the upper boss portion 32 has been described in the first embodiment. In contrast, a case in which the casing cover 3 is made of metal and the casing cover 3 directly holds the upper bearing 8 will be described in this embodiment. Meanwhile, the repeated description of the same components as the components of the molded motor 100 according to the above-mentioned first embodiment will be omitted.

Figure 13:
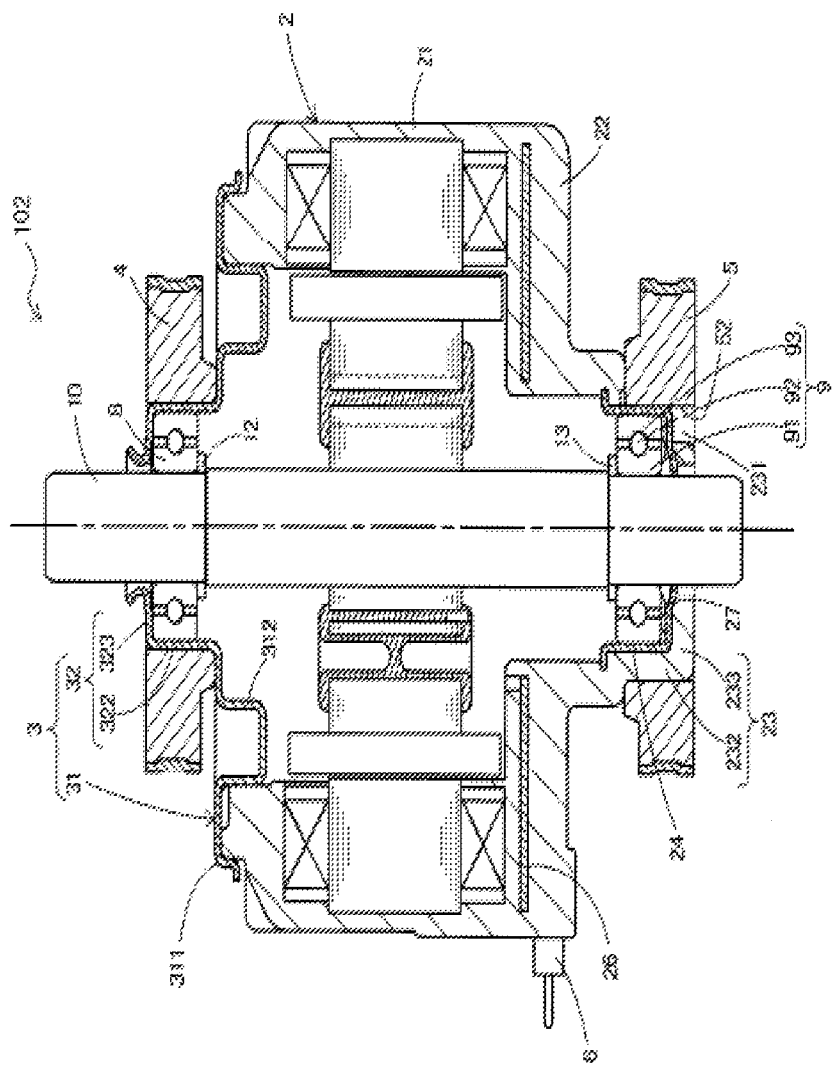
FIG. 13 is a cross-sectional view showing an example of the structure of a molded motor 102 according to a third embodiment.

FIG. 13 is a cross-sectional view showing an example of the structure of a molded motor 102 according to a third embodiment of the invention. In comparison with the molded motor 100 of FIG. 7, the molded motor 102 is different from the molded motor 100 in that the casing cover 3 is made of metal and the upper boss portion 32 directly holds the upper bearing 8 on the inside thereof in the radial direction. The upper bearing 8 is inserted into the inner peripheral surface of the cylindrical portion 322 of the upper boss portion 32.

For example, the casing cover 3 is formed by pressing a metal plate such as a galvanized steel plate. The press-fitting portion 312 of the top wall portion 31 is press-fitted to the inner peripheral surface of the cylindrical portion 21 of the stator 25, so that the casing cover 3 is fixed to the motor casing 2.

One end of a bearing conducting member (not shown) comes into contact with the outer peripheral surface of the lower bearing bracket 24 that is exposed from the lower boss recess 231, and the other end of the bearing conducting member comes into contact with the casing cover 3. In the molded motor 102 according to this embodiment, the bearing conducting member electrically connects the casing cover 3 to the lower bearing bracket 24. Accordingly, the electrolytic corrosion of the upper and lower bearings 8 and 9 can be suppressed.

Meanwhile, the examples of the case in which the lower boss recesses 231 are formed at the lower boss portion 23 and receive the rotation prevention portions 52 of the lower damping member 5 have been described in the first to third embodiments. However, the invention may be adapted so that convex lower boss protrusions of the outer peripheral surface are formed on the lower boss portion 23 and are received in the rotation prevention portions of the lower damping member 5.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A motor comprising:
   a shaft extending in an axial direction, the axial direction comprising a first direction and a second direction opposite to the first direction;
   a rotor;
   a stator,
   first direction bearing;
   a second direction bearing;
   a motor casing that is made of a resin;
   a casing cover;
   a second direction damping member,
   an upper damping member that is formed of an annular elastic material,
   a lower bearing bracket that is made of metal;
   an upper bearing bracket that is made of metal, and
   a bearing conducting member,
   wherein the rotor is fixed to the shaft,
   the stator is disposed outside the rotor in a radial direction,
   the first direction bearing is disposed in the first direction relative to the rotor and is structured to support the shaft so as to allow the shaft to be rotatable,
   the second direction bearing is disposed in the second direction relative to the rotor and is structured to support the shaft so as to allow the shaft to be rotatable,
   the motor casing comprises an opening formed at a first direction portion thereof in the axial direction,
   the casing cover is structured to hold the first direction bearing and cover the opening,
   the second direction damping member is formed of an annular elastic material,
   the motor casing comprises:
     a cylindrical portion;
     a second direction wall portion; and
     a second direction boss portion;
     wherein the cylindrical portion covers an outer periphery of the stator;
     the second direction wall portion extends inward from the cylindrical portion in the radial direction;
     the second direction boss portion is formed in the shape of a cylinder that protrudes in the second direction from the second direction wall portion;
     the second direction bearing is disposed inside the second direction boss portion in the radial direction;
     the second direction damping member is disposed outside the second direction boss portion in the radial direction;
     and a second direction boss recess or a second direction boss protrusion is provided on an outer peripheral surface of the second direction boss portion,
   a convex or concave rotation prevention portion is provided on an inner peripheral surface of the second direction damping member, and the convex rotation prevention portion is received in the second direction boss recess or the concave rotation prevention portion receives the second direction boss protrusion;
   the casing cover is made of a resin and includes a top wall portion and an upper boss portion,
   the top wall portion is formed in an annular shape and covers the opening of the motor casing,
   the upper boss portion is formed in the shape of a cylinder that includes a lid and protrudes upward from an upper surface of the top wall portion in the axial direction, the upper bearing is disposed inside the upper boss portion in the radial direction, the upper damping member is disposed outside the upper boss portion in the radial direction, and the upper boss portion is provided with an upper boss recess or an upper boss protrusion,
   a convex or concave rotation prevention portion is provided on an inner peripheral surface of the upper damping member, and the convex rotation prevention portion is received in the lower boss recess or the concave rotation prevention portion receives the lower boss protrusion;
   the lower bearing bracket is received inside the lower boss portion in the radial direction, and is structured to hold the lower bearing,
   the upper bearing bracket is received inside the upper boss portion in the radial direction, and is structured to hold the upper bearing,
   the bearing conducting member is disposed outside the motor casing in the radial direction and is structured to electrically connect the upper bearing to the lower bearing,
   the upper bearing and the lower bearing are made of metal,
   an inner peripheral surface of the lower bearing bracket contacts an outer peripheral surface of the lower bearing, and a part of an outer peripheral surface of the lower bearing bracket is exposed in the lower boss recess,
   an inner peripheral surface of the upper bearing bracket contacts an outer peripheral surface of the upper bearing, and a part of an outer peripheral surface of the upper bearing bracket is exposed in the upper boss recess, and
   the bearing conducting member contacts the outer peripheral surface of the upper bearing bracket that is exposed from the upper boss recess, and the outer peripheral surface of the lower bearing bracket that is exposed from the lower boss recess.

2. The motor according to claim 1,
   wherein the second direction boss portion is a lower boss portion;
   wherein the lower boss portion comprises two or more lower boss recesses, and
   the lower boss recesses extend upward from a lower end of the lower boss portion.

3. The motor according to claim 2,
   wherein the lower boss recesses are disposed at regular intervals in a circumferential direction.

4. The motor according to claim 1,
   wherein the upper boss portion comprises two or more upper boss recesses, and
   the upper boss recesses extend downward from an upper end of the upper boss portion.

5. The motor according to claim 4,
   wherein the upper boss recesses are disposed at regular intervals in a circumferential direction.

6. The motor according to claim 1,
   wherein the bearing conducting member is a belt-like conductive tape, one end of the conductive tape is disposed in the lower boss recess, and
   the other end of the conductive tape is disposed in the upper boss recess.

7. The motor according to claim 6,
   wherein one end of the conductive tape is disposed on the outer peripheral surface of the lower bearing bracket that is exposed from the lower boss recess, and
   the rotation prevention portion of the lower damping member contacts the one end of the conductive tape.

8. The motor according to claim 6,
wherein the other end of the conductive tape is disposed on the outer peripheral surface of the upper bearing bracket that is exposed from the upper boss recess, and
the rotation prevention portion of the upper damping member contacts the other end of the conductive tape.

9. The motor according to claim 6,
wherein an outer diameter of the top wall portion of the casing cover is smaller than an outer diameter of the cylindrical portion of the motor casing.

10. The motor according to claim 6,
wherein the conductive tape is disposed at a circumferential position where a lower surface of an outer peripheral edge portion of the top wall portion and an upper surface of the cylindrical portion of the motor casing contact each other.

11. The motor according to claim 1,
wherein a lower end portion of the upper boss portion is present at the same position as the position of an outer peripheral edge portion of the top wall portion in the vertical direction or is positioned above the outer peripheral edge portion.

12. The motor according to claim 11,
wherein the top wall portion of the casing cover includes an inclined surface, and
the inclined surface is lowered downward in the axial direction radially toward its outside.

13. The motor according to claim 11,
wherein an upper surface of the top wall portion of the casing cover is a flat shape.

14. The motor according to claim 1,
wherein the top wall portion of the casing cover comprises a cylindrical press-fitting portion that protrudes downward from a lower surface in the axial direction, and
a concave crack preventing portion is provided on an outer peripheral surface of the press-fitting portion, and the press-fitting portion is press-fitted to an inner peripheral surface of the cylindrical portion.

15. The motor according to claim 14,
wherein the top wall portion of the casing cover comprises an outer peripheral edge portion of which the lower surface faces an upper end face of the cylindrical portion of the motor casing,
the outer peripheral edge portion of the top wall portion is provided with a drain hole, and
the drain hole extends outward from a position, which faces a drain hole of the motor casing, in the radial direction on a lower surface of the outer peripheral edge portion.

16. The motor according to claim 1,
wherein the top wall portion of the casing cover is provided with a misplacement preventing protrusion or a misplacement preventing recess as a protrusion or a recess formed on a lower surface thereof, and
the misplacement preventing protrusion or the misplacement preventing recess is disposed at a position that faces a recess or a protrusion of the motor casing.

17. A motor comprising:
a shaft extending in an axial direction, the axial direction comprising a first direction and a second direction opposite to the first direction;
a rotor;
a stator;
first direction bearing;
a second direction bearing;
a motor casing that is made of a resin;
a casing cover;
a second direction damping member, and
an upper damping member that is formed of an annular elastic material,
wherein the rotor is fixed to the shaft,
the stator is disposed outside the rotor in a radial direction,
the first direction bearing is disposed in the first direction relative to the rotor and is structured to support the shaft so as to allow the shaft to be rotatable,
the second direction bearing is disposed in the second direction relative to the rotor and is structured to support the shaft so as to allow the shaft to be rotatable,
the motor casing comprises an opening formed at a first direction portion thereof in the axial direction,
the casing cover is structured to hold the first direction bearing and cover the opening,
the second direction damping member is formed of an annular elastic material,
the motor casing comprises:
a cylindrical portion;
a second direction wall portion; and
a second direction boss portion;
wherein the cylindrical portion covers an outer periphery of the stator;
the second direction wall portion extends inward from the cylindrical portion in the radial direction;
the second direction boss portion is formed in the shape of a cylinder that protrudes in the second direction from the second direction wall portion;
the second direction bearing is disposed inside the second direction boss portion in the radial direction;
the second direction damping member is disposed outside the second direction boss portion in the radial direction;
and a second direction boss recess or a second direction boss protrusion is provided on an outer peripheral surface of the second direction boss portion,
a convex or concave rotation prevention portion is provided on an inner peripheral surface of the second direction damping member, and the convex rotation prevention portion is received in the second direction boss recess or the concave rotation prevention portion receives the second direction boss protrusion;
the casing cover is made of a resin and includes a top wall portion and an upper boss portion,
the top wall portion is formed in an annular shape and covers the opening of the motor casing,
the upper boss portion is formed in the shape of a cylinder that includes a lid and protrudes upward from an upper surface of the top wall portion in the axial direction, the upper bearing is disposed inside the upper boss portion in the radial direction, the upper damping member is disposed outside the upper boss portion in the radial direction, and the upper boss portion is provided with an upper boss recess or an upper boss protrusion,
a convex or concave rotation prevention portion is provided on an inner peripheral surface of the upper damping member, and the convex rotation prevention portion is received in the lower boss recess or the concave rotation prevention portion receives the lower boss protrusion;
the top wall portion of the casing cover comprises a cylindrical press-fitting portion that protrudes downward from a lower surface in the axial direction, and
a concave crack preventing portion is provided on an outer peripheral surface of the press-fitting portion, and the press-fitting portion is press-fitted to an inner peripheral surface of the cylindrical portion.

18. A motor comprising:

a shaft extending in an axial direction, the axial direction comprising a first direction and a second direction opposite to the first direction;

a rotor;

a stator;

first direction bearing;

a second direction bearing;

a motor casing that is made of a resin;

a casing cover;

a second direction damping member;

a lower bearing bracket that is made of metal, is received inside the lower boss portion in the radial direction, and is structured to hold the lower bearing; and a bearing conducting member that is disposed outside the motor casing in the radial direction and is structured to electrically connect the upper bearing to the lower bearing, the rotor is fixed to the shaft, the stator is disposed outside the rotor in a radial direction, the first direction bearing is disposed in the first direction relative to the rotor and is structured to support the shaft so as to allow the shaft to be rotatable, the second direction bearing is disposed in the second direction relative to the rotor and is structured to support the shaft so as to allow the shaft to be rotatable, the motor casing comprises an opening formed at a first direction portion thereof in the axial direction, the casing cover is structured to hold the first direction bearing and cover the opening, the second direction damping member is formed of an annular elastic material, the motor casing comprises:
a cylindrical portion;
a second direction wall portion; and
a second direction boss portion;
wherein the cylindrical portion covers an outer periphery of the stator;
the second direction wall portion extends inward from the cylindrical portion in the radial direction;
the second direction boss portion is formed in the shape of a cylinder that protrudes in the second direction from the second direction wall portion;
the second direction bearing is disposed inside the second direction boss portion in the radial direction;
the second direction damping member is disposed outside the second direction boss portion in the radial direction;
and a second direction boss recess or a second direction boss protrusion is provided on an outer peripheral surface of the second direction boss portion, and a convex or concave rotation prevention portion is provided on an inner peripheral surface of the second direction damping member, and the convex rotation prevention portion is received in the second direction boss recess or the concave rotation prevention portion receives the second direction boss protrusion;

wherein the casing cover is made of metal, the upper and lower bearings are made of metal, an inner peripheral surface of the lower bearing bracket contacts an outer peripheral surface of the lower bearing, a part of an outer peripheral surface of the lower bearing bracket is exposed in the lower boss recess, one end of the bearing conducting member contacts the outer peripheral surface of the lower bearing bracket that is exposed from the lower boss recess, and the other end of the bearing conducting member contacts the casing cover.

\* \* \* \* \*